(12) United States Patent
Chen et al.

(10) Patent No.: US 9,489,328 B2
(45) Date of Patent: Nov. 8, 2016

(54) SYSTEM ON CHIP AND METHOD FOR ACCESSING DEVICE ON BUS

(71) Applicant: Huawei Technologies Co., Ltd., Shenzhen, Guangdong (CN)

(72) Inventors: Jian Chen, Shanghai (CN); Jianfeng Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 538 days.

(21) Appl. No.: 14/141,137

(22) Filed: Dec. 26, 2013

(65) Prior Publication Data

US 2014/0189179 A1 Jul. 3, 2014

(30) Foreign Application Priority Data

Dec. 28, 2012 (CN) .......................... 2012 1 0585522

(51) Int. Cl.
*G06F 13/00* (2006.01)
*G06F 15/00* (2006.01)
*G06F 13/362* (2006.01)

(52) U.S. Cl.
CPC .................................. *G06F 13/362* (2013.01)

(58) Field of Classification Search
None
See application file for complete search history.

(56) References Cited

U.S. PATENT DOCUMENTS

| | | | | |
|---|---|---|---|---|
| 8,813,220 B2 * | 8/2014 | Knapp | ................ | H04L 63/1425 726/22 |
| 2003/0204693 A1 * | 10/2003 | Moran | ................ | G06F 12/1483 711/163 |
| 2007/0076757 A1 * | 4/2007 | Dodd | ................ | H04L 12/40032 370/469 |
| 2011/0296066 A1 | 12/2011 | Xia | | |
| 2012/0263462 A1 * | 10/2012 | Koren | ..................... | H04L 45/60 398/45 |
| 2014/0281321 A1 * | 9/2014 | Carreno | .................. | G06F 21/57 711/164 |

FOREIGN PATENT DOCUMENTS

| | | |
|---|---|---|
| CN | 1556476 A | 12/2004 |
| CN | 101464848 A | 6/2009 |
| CN | 101582058 A | 11/2009 |
| CN | 101853237 A | 10/2010 |
| CN | 101937412 A | 1/2011 |
| CN | 102045379 A | 5/2011 |

* cited by examiner

*Primary Examiner* — Hyun Nam
(74) *Attorney, Agent, or Firm* — Leydig, Voit & Mayer, Ltd.

(57) ABSTRACT

The present invention discloses a system on a chip and a method for accessing a device on a bus, and belongs to the electronics field. The system includes: a primary device, configured to send an access request; an extension module, configured to receive the access request sent by the primary device, and extend the ID signal in the access request according to the number of primary devices; a parsing module, configured to parse the access request output by the extension module to obtain an access response instruction; and a secondary device, configured to respond to the extended access request according to the access response instruction. By using the foregoing technical solution, the present invention allows the primary device to flexibly access the secondary device, thereby reducing requirements on the primary and secondary devices.

8 Claims, 2 Drawing Sheets

SYSTEM ON CHIP AND METHOD FOR ACCESSING DEVICE ON BUS

CROSS-REFERENCE TO RELATED APPLICATIONS

This application claims priority to Chinese Patent Application No. 201210585522.3, filed on Dec. 28, 2012, which is hereby incorporated by reference in its entirety.

TECHNICAL FIELD

The present invention relates to the electronics field, and in particular, to a system on a chip and a method for accessing a device on a bus.

BACKGROUND

A System On Chip (SOC) is a system integrating a microprocessor device, a Internet Protocol (IP) core device, a memory device or an off-chip storage control interface device into a single chip, where the devices in the system are connected through a bus, for example, an Advanced Extensible Interface (AXI) of the ARM corporation.

With the popularity of mobile terminals based on an SOC, applications for performing data services and payment services by using motile terminals are used more frequently, and security information stored on devices inside the SOC becomes more open. In order to protect the devices storing the security information from being accessed randomly, security management needs to be performed when the devices inside the system are accessed.

Prior art 1 provides a method for accessing a device on a bus, including: receiving an access request sent by a primary device; obtaining, by a hardware address decoder according to the access request, a secondary device to be accessed; and responding, by a security control logical circuit, to the access request of the primary device according to control logic to be accessed on the secondary device to allow or refuse the primary device to access the secondary device to be accessed.

Prior art 2 provides a method for accessing a device on a bus, including: receiving an access request and a bus security control command sent by a primary device; obtaining, by a hardware address decoder according to the access request, a secondary device to be accessed; and responding, by the secondary device to the access request of the primary device according to the bus security control command to allow or refuse the primary device to access the secondary device.

During the implementation of the present invention, the inventors find that the prior art has at least the following problems:

In prior art 1, a response, regarding the primary device accessing the secondary device, is made by using a hardware address decoder and a security control logical circuit causing an access relationship to be fixed, and the access relationship between the devices cannot be changed in different application scenarios; in prior art 2, a response, regarding the primary device accessing the secondary device, is made by using a bus security control command and a hardware address decoder which results in that the primary and secondary devices need to support the bus security control command and increases requirements on the devices.

SUMMARY

In order to solve the problems of the prior art, embodiments of the present invention provide a system on a chip and a method for accessing a device on a bus. The technical solutions are as follows.

In one aspect, a system on a chip is provided, where the system includes:

a primary device, configured to send an access request, where the access request includes an address information for identifying a secondary device to be accessed and an ID signal for identifying a read/write operation in the access request;

an extension module, configured to receive the access request sent by the primary device, and extend the ID signal in the access request according to the number of primary devices;

a parsing module, configured to parse the access request output by the extension module to obtain an access response instruction; and a secondary device, configured to respond to the extended access request according to the access response instruction.

Preferentially, the extension module includes:

a determining unit, configured to determine the number of extension bits according to a predefined formula and the number of primary devices; and an extension unit, configured to extend the ID signal in the access request according to the number of extension bits determined by the determining unit.

Preferentially, the determining unit is specifically configured to:

according to the number N of primary devices and a predefined formula $\log_2 x$, determine that the number of extension bits is $\log_2 N$, where N is a positive integer.

Preferentially, the parsing module is specifically configured to:

parse the access request output by the extension module to obtain address information of the secondary device to be accessed and serial number information of the primary device; determine the access request according to a predefined access rule, the address information of the secondary device to be accessed, and the serial number information of the primary device; and obtain a response instruction that allows access if the predefined rule is satisfied; otherwise, obtain a response instruction that rejects access.

In another aspect, a method for accessing a device on a bus of a system on a chip is provided, where the method includes:

receiving an access request sent by a primary device, and extending an ID signal in the access request according to the number of primary devices, where the access request includes an address information for identifying a secondary device to be accessed and the ID signal for identifying a read/write operation in the access request; and parsing the extended access request to obtain an access response instruction, so that the secondary device to be accessed responds to the extended access request according to the access response instruction.

Preferentially, the extending the ID signal in the access request according to the number of primary devices specifically includes:

determining the number of extension bits according to a predefined formula and the number of primary devices, and extending the ID signal in the access request according to the number of extension bits.

Preferentially, the determining the number of extension bits according to a predefined formula and the number of primary devices specifically includes:

according to the number N of primary devices and a predefined formula $\log_2 x$, determining that the number of extension bits is $\log_2 N$, where N is a positive integer.

Preferentially, the parsing the extended access request to obtain the access response instruction specifically includes:

parsing the extended access request to obtain address information of the secondary device to be accessed and serial number information of the primary device; determining the access request according to a predefined access rule, the address information of the secondary device to be accessed, and the serial number information of the primary device; and obtaining a response instruction that allows access if the predefined rule is satisfied; otherwise, obtaining a response instruction that rejects access.

The technical solutions provided by the embodiments of the present invention produce the following benefits:

A primary device sends an access request including an address information for identifying a secondary device to be accessed and an ID signal for identifying a read/write operation in the access request, an extension module extends the ID signal in the received access request according to the number of primary devices, a parsing module parses the extended access request to obtain an access response instruction, and a secondary device processes the extended access request according to the access response instruction, so that the primary device flexibly accesses the secondary device, which reduces requirements on the primary and secondary devices.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the embodiments of the present invention in detail with reference to the accompanying drawings.

Embodiment 1

This embodiment provides a system on a chip, where devices inside the system are connected through a bus. This embodiment sets no specific limit to a type of the bus that may be Advanced Peripheral Bus (APB) of AMBA 2.0, AXI of AMBA 3.0, Wishbone, and the like.

Figure 1:
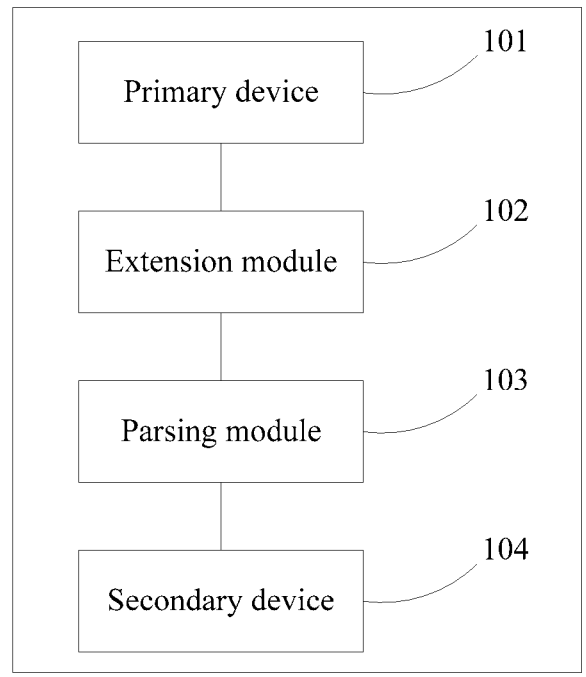
FIG. 1 is a schematic structural diagram of a system on a chip according to Embodiment 1 of the present invention.

Referring to FIG. 1, the system on a chip according to the embodiment of the present invention may include a primary device 101, an extension module 102, a parsing module 103 and a secondary device 104.

The primary device 101, configured to send an access request, where the access request includes an address information for identifying a secondary device to be accessed and an ID signal for identifying a read/write operation in the access request.

Specifically, one or more secondary devices exist on the SOC regarding the primary device. When the primary device needs to access one secondary device among the secondary devices, the primary device needs to send an access request regarding the secondary device, where the access request includes an address information for identifying the secondary device to be accessed and an ID signal for identifying a read/write operation in the access request.

For example, two secondary devices exist on the SOC, where an address information of the secondary devices is identified by using 1-bit binary information [x1]. A value 0 of the binary information [x1] represents a secondary device whose serial number is 1, and a value 1 of the binary information [x1] represents a secondary device whose serial number is 2. Two types of operations are available for the secondary device, namely, a read operation and a write operation. An ID signal for the two types of operations is identified by using 1-bit binary information [x2], where a read operation is represented by a value 0 and a write operation is represented by a value 1.

When the primary device needs to perform a read access operation on the secondary device whose serial number is 1, the sent access request includes the address information 0 of the secondary device whose serial number is 1 and the ID signal 0 for a read operation, that is, [0][0], where a higher order bit is [x1] and a lower order bit is [x2]. The embodiment sets no limit to the number of secondary devices, no limit to the number of serial numbers that may be 2, 3, or another positive integer value, and no limit to the specific representation method for the secondary device serial number and the read and write operations, which may be binary for representation in a 1-bit binary or 2-bit binary mode, or decimal for representation in a 1-digit decimal or 2-digit decimal mode. The embodiment sets no limit to the type of operations, which may be a read operation or a write operation.

In order to implement security management in a better way for the primary device to access the secondary device, an internal storage space of a secondary device is divided, where the divided storage space is identified by using an address information. For example, an internal storage space of the secondary device whose serial number is 1 is divided into two spaces, one of which is a space for storing data and the other is a space for storing configuration and attributes. The two spaces are identified by using 1-bit binary information [x3]; then, the space for storing data of the secondary device whose serial number is 1 is identified as [0] [0] by using an address information, and the space for storing configuration and attributes of the secondary device whose serial number is 1 is identified as [1][0] by using an address information, where the second bit represents the serial number of the secondary device, and the first bit represents a sub-space of the storage space. The space for storing data may be further divided into N sub-spaces, and the space for storing configuration and attributes may also be further divided into N sub-spaces. The embodiment sets no limit to the divided quantities of the internal storage space of the secondary device, which may be a positive integer value such as 2 or 3.

In order to distinguish multiple read/write operations for performing security management for the primary device accessing the secondary device and avoiding a failure to simultaneously process multiple access requests, the ID signal is added for the read/write operation to distinguish multiple read/write operations, thereby implementing outstanding transmission and access for the multiple read/write operations. That is, the primary device may start a new access request before the previous access request is ended, where read/write operations having the same ID are completed in sequence while no limit is set to those having different IDs.

For example, the primary device sends a read operation 1 first to perform a read operation on the secondary device whose serial number is 1. The primary device may send a read operation 2 before receiving a response to the read operation 1 sent by the secondary device. In order to distinguish the read operation 1 and the read operation 2, the ID signal of the read operations is extended, where 1-bit binary information [x4] is used to represent the serial number of the two read operations. Then, the read operation 1 performed on the secondary device whose serial number is 1 is represented as [0][0], and the read operation 2 performed on the secondary device whose serial number is 1 is represented as [1][0], where the second bit represents the serial number of the secondary device, and the first bit represents the serial number of the read operation. The embodiment sets no limit to the type of read operations, which may be 2 or 3.

In an actual application, the primary device may be a CPU (Central Processing Unit) or another IP core device such as a DSP (Digital Signal Processor). The embodiment sets no limit to the specific form of the primary device, and no limit to the type of operations that may be a read operation or a write operation.

The extension module 102 is configured to receive the access request sent by the primary device 101, and extend the ID signal in the access request according to the number of primary devices 101.

Figure 2:
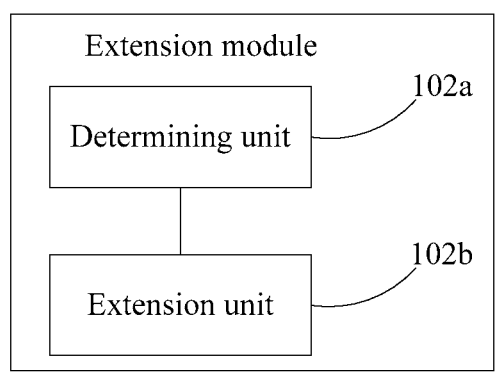
FIG. 2 is a schematic structural diagram of an extension module according to Embodiment 1 of the present invention.

Specifically, referring to FIG. 2, the extension module 102 includes a determining unit 102a and an extension unit 102b.

The determining unit 102a, configured to determine the number of extension bits according to a predefined formula and the number of primary devices.

For example, the number of primary devices is 2 and the determined number of extension bit is 2 bits, when the extended 2 bits are 10, it identifies the primary device 1; when the extended 2 bits are 01, it identifies the primary device 2. The embodiment sets no limit to the specific form of the extended extension bit to represent the primary device, which may be 10 and 01, 01 and 10, or another 2-bit representation form.

The extension unit 102b, configured to extend the ID signal in the access request according to the number of extension bits determined by the determining unit 102a.

For example, according to the related description of the determining unit 102a, when the number of primary devices is 2, the ID signal in the access request sent by the primary device is extended to two bits, where the newly added two bits in the ID signal are used to represent the serial numbers of the primary devices.

In order to properly utilize a bus bandwidth, preferentially, the predefined formula is $\log_2 x$, and when the number of primary devices is N, it is determined that the number of the extension bits is $\log_2 N$, where N is a positive integer.

For example, when the number of primary devices is 2 and the number of extension bits determined according to the formula $\log_2 N$ is 1, a value 0 of the bit represents the primary device 1, and a value 1 of the bit represents the primary device 2. When the number of primary devices is 3 to 4 and the number of extension bits determined by rounding up the value obtained according to the formula $\log_2 N$ is 2, a value 00 of the two bits represents the primary device 1, a value 01 of the two bits represents the primary device 2, a value 10 of the two bits represents the primary device 3, and a value 11 of the two bits represents the primary device 4. The embodiment sets no limit to the specific form of the extended extension bits to represent the primary devices, which may be 0 representing the primary device 1 while 1 representing the primary device 2, and may also be 1 representing the primary device 1 while 0 representing the primary device 2. The embodiment sets no limit to the number N of the primary devices, which may be 2, 3, 4 or another positive integer.

The parsing module 103, configured to parse the access request output by the extension module 102 to obtain an access response instruction.

Specifically, the parsing module 103 is specifically configured to:

parse the access request output by the extension module 102 to obtain address information of the secondary device to be accessed and serial number information of the primary device; determine the access request according to a predefined access rule, the address information of the secondary device to be accessed, and the serial number information of the primary device; and obtain a response instruction that allows access if the predefined rule is satisfied; otherwise, obtain a response instruction that rejects access.

For example, the primary device whose serial number is 1 sends an access request for performing a read operation on the secondary device whose serial number is 1; the parsing module 103 parses the access request output by the extension module 102 to obtain that an address serial number of the secondary device to be accessed is 1 and the serial number of the primary device sending the access request is 1; when the predefined rule is that the secondary device whose serial number is 1 is accessible by the primary device whose serial number is 1, because the parsing result satisfies the predefined rule, a response instruction that allows access is obtained; and when the predefined rule is that the secondary device whose serial number is 1 is not accessible by the primary device whose serial number is 1, because the parsing result does not satisfy the predefined rule, a response instruction that rejects access is obtained.

The secondary device whose serial number is 1 divides its storage space into N sub-spaces. The primary device whose serial number is 1 sends an access request for performing a read operation on a second sub-space of the secondary device whose serial number is 1; the parsing module 103 parses the access request output by the extension module 102 to obtain that an address serial number of the secondary device to be accessed is 12 and the serial number of the primary device sending the access request is 1, where 1 in the address serial number corresponds to the serial number of the secondary device, and 2 corresponds to the serial number of the sub-space in the secondary device. When a predefined rule is that the second sub-space of the secondary device whose serial number is 1 is accessible by the primary device whose serial number is 1, because the parsing result satisfies the predefined rule, a response instruction that allows access is obtained; when the predefined rule is that the second sub-space of the secondary device whose serial number is 1 is not accessible by the primary device whose serial number is 1, because the parsing result does not satisfy the predefined rule, a response instruction that rejects access is obtained.

The embodiment sets no limit to the operation type of the access request, which may be a read operation or a write operation, and sets no specific limit to the predefined rule, which may be that the secondary device whose serial number is 1 is accessible by the primary device or that the secondary device whose serial number is 1 is not accessible by the primary device.

The secondary device 104, configured to respond to the extended access request according to the access response instruction.

Specifically, if the obtained access response instruction is a response instruction that allows access and the access request is a read operation on the secondary device, the secondary device allows the read operation.

If the obtained access response instruction is a response instruction that allows access and the access request is a write operation on the secondary device, the secondary device allows the write operation.

If the obtained access response instruction is a response instruction that rejects access and the access request is a read operation on the secondary device, the secondary device rejects the read operation, and may further, in order to prompt the primary device in a better way, return operation error information or operation invalid information.

If the obtained access response instruction is a response instruction that rejects access and the access request is a write operation on the secondary device, the secondary device rejects the write operation, and may further, in order to prompt the primary device in a better way, return operation error information or operation invalid information.

In an actual application, the secondary device may be an internal RAM (Random Access Memory) or another IP core device such as an APB (Advanced Peripheral Bus). The embodiment sets no limit to the specific form of the secondary device.

In the system according to the embodiment, a primary device sends an access request including an address information for identifying a secondary device to be accessed and an ID signal for identifying a read/write operation in the access request, an extension module extends the ID signal in the received access request according to the number of primary devices, a parsing module parses the extended access request to obtain an access response instruction, and a secondary device processes the extended access request according to the access response instruction, so that the primary device flexibly accesses the secondary device, which reduces requirements on the primary and secondary devices.

Embodiment 2

Figure 3:
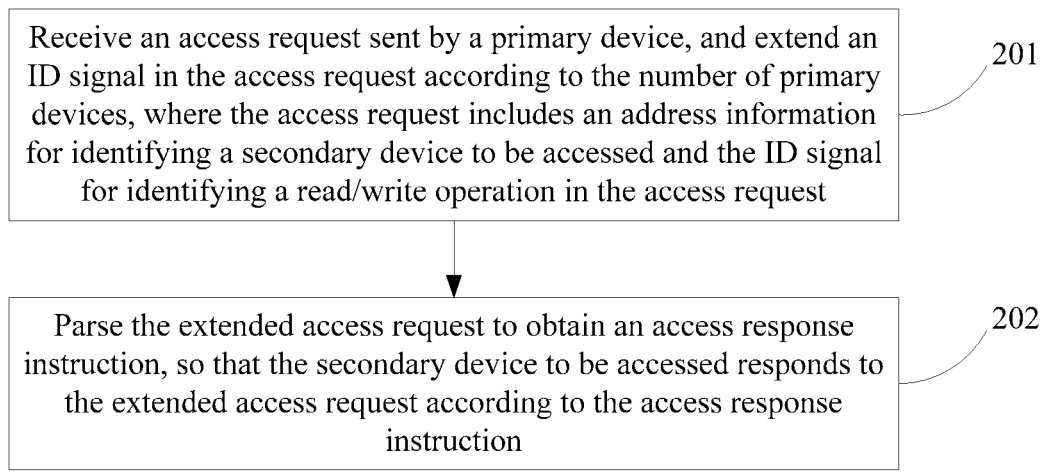
FIG. 3 is a flowchart of a method for accessing a device on a bus of system on a chip according to Embodiment 2 of the present invention.

The embodiment of the present invention provides a method for accessing a device on a bus based on the system on a chip according to Embodiment 1. With reference to the content of Embodiment 1, referring to FIG. 3, the process of the method according to the embodiment may be as follows:

201. Receive an access request sent by a primary device, and extend an ID signal in the access request according to the number of primary devices, where the access request includes an address information for identifying a secondary device to be accessed and the ID signal for identifying a read/write operation in the access request.

Specifically, the related description of the primary device 101 and the extension module 102 in Embodiment 1 may be referenced for the implementation of this step, which is not described repeatedly herein.

202. Parse the extended access request to obtain an access response instruction, so that the secondary device to be accessed responds to the extended access request according to the access response instruction.

Specifically, the related description of the parsing module 103 and the secondary device 104 in Embodiment 1 may be referenced for the implementation of this step, which is not described repeatedly herein.

In the method according to the embodiment, by receiving the access request including an address information for identifying a secondary device to be accessed and an ID signal for identifying a read/write operation in the access request, extending the ID signal in the received access request according to the number of primary devices, and parsing the extended access request to obtain an access response instruction, so that the secondary device to be accessed processes the extended access request according to the access response instruction. Therefore, so that the primary device flexibly accesses the secondary device, which reduces requirements on the primary and secondary devices.

It should be noted that, when a device is accessed on a bus of a system on a chip according to the foregoing embodiments, the classification of the functional modules are used merely as an example for description; in an actual application, the functions may be assigned to different functional modules according to requirements, that is, internal structures of the system are classified into different functional modules for completing all or a part of functions described above. In addition, the system on a chip and the method embodiment for accessing a device on a bus of a system on a chip according to the foregoing embodiments belong to the same idea, where the method embodiment may be referenced for the specific implementation process and is not described repeatedly herein.

The serial numbers of the foregoing embodiments of the present invention are used merely for description, and does not represent priority of the embodiments.

Persons of ordinary skill in the art may understand that all or a part of the steps in the embodiments may be implemented by hardware, or by a program instructing related hardware. The program may be stored in a computer readable storage medium, and the storage medium may be a read-only memory, a magnetic disk, an optical disc, and so on.

The above are merely exemplary embodiments of the present invention. However, the scope of the present invention is not limited thereto. All modifications, equivalent replacements, and improvements made without departing from the spirit and principle of the present invention shall fall within the scope of the present invention.

What is claimed is:

1. A system on a chip, comprising:
  a primary device, configured to send an access request, wherein the access request comprises an address information for identifying a secondary device to be accessed and an ID signal for identifying a read/write operation in the access request;
  an extension module, configured to receive the access request sent by the primary device, and extend the ID signal in the access request according to the number of primary devices;

a parsing module, configured to parse the access request output by the extension module to obtain an access response instruction; and a secondary device, configured to respond to the extended access request according to the access response instruction.

2. The system according to claim 1, wherein the extension module comprises:

a determining unit, configured to determine the number of extension bits according to a predefined formula and the number of primary devices; and an extension unit, configured to extend the ID signal in the access request according to the number of extension bits determined by the determining unit.

3. The system according to claim 2, wherein the determining unit is specifically configured to:

according to the number N of primary devices and a predefined formula $\log_2 X$, determine that the number of extension bits is $\log_2 N$, wherein N is a positive integer.

4. The system according to claim 1, wherein the parsing module is specifically configured to:

parse the access request output by the extension module to obtain address information of the secondary device to be accessed and serial number information of the primary device;

determine the access request according to a predefined access rule, the address information of the secondary device to be accessed, and the serial number information of the primary device;

and obtain a response instruction that allows access if the predefined rule is satisfied; if the predefined rule is not satisfied, obtain a response instruction that rejects access.

5. A method for accessing a device on a bus for a system on a chip, comprising:

receiving an access request sent by a primary device, and extending an ID signal in the access request according to the number of primary devices, wherein the access request comprises an address information for identifying a secondary device to be accessed and the ID signal for identifying a read/write operation in the access request; and parsing the extended access request to obtain an access response instruction, so that the secondary device to be accessed responds to the extended access request according to the access response instruction.

6. The method according to claim 5, wherein the extending the ID signal in the access request according to the number of primary devices specifically comprises:

determining the number of extension bits according to a predefined formula and the number of primary devices, and extending the ID signal in the access request according to the number of extension bits.

7. The method according to claim 6, wherein the determining the number of extension bits according to the predefined formula and the number of primary devices specifically comprises:

according to the number N of primary devices and a predefined formula $\log_2 X$, determining that the number of extension bits is $\log_2 N$, wherein N is a positive integer.

8. The method according to claim 5, wherein the parsing the extended access request to obtain the access response instruction specifically comprises:

parsing the extended access request to obtain address information of the secondary device to be accessed and serial number information of the primary device; determining the access request according to a predefined access rule, the address information of the secondary device to be accessed, and the serial number information of the primary device; and obtaining a response instruction that allows access if the predefined rule is satisfied; if the predefined rule is not satisfied, obtaining a response instruction that rejects access.

* * * * *